(12) United States Patent
Bonnier et al.

(10) Patent No.: US 8,390,887 B2
(45) Date of Patent: Mar. 5, 2013

(54) METHOD, APPARATUS AND COMPUTER PROGRAM FOR ADAPTIVE COMPENSATION OF A MTF

(75) Inventors: Nicolas P. M. F. Bonnier, Paris (FR); Albrecht J. Lindner, Holzgerlingen (DE)

(73) Assignee: Oce-Technologies B.V., Venlo (NL)

( * ) Notice: Subject to any disclaimer, the term of this patent is extended or adjusted under 35 U.S.C. 154(b) by 311 days.

(21) Appl. No.: 12/732,983

(22) Filed: Mar. 26, 2010

(65) Prior Publication Data

US 2010/0302562 A1 Dec. 2, 2010

Related U.S. Application Data

(63) Continuation of application No. PCT/EP2008/062917, filed on Sep. 26, 2008.

(30) Foreign Application Priority Data

Sep. 28, 2007 (EP) .................................... 07117464
Sep. 9, 2008 (EP) .................................... 08305539

(51) Int. Cl.
    *H04N 1/60* (2006.01)
(52) U.S. Cl. ......... 358/1.9; 358/2.1; 358/3.26; 382/254; 382/275
(58) Field of Classification Search .................... 358/1.9, 358/2.1, 3.26, 3.27, 530, 532; 382/254, 260, 382/261, 263, 264, 266, 275
See application file for complete search history.

(56) References Cited

U.S. PATENT DOCUMENTS

| | | | | |
|---|---|---|---|---|
| 4,517,607 A * | 5/1985 | Ohkouchi et al. | ............ | 358/447 |
| 4,969,051 A * | 11/1990 | Sasaki | ............ | 358/447 |
| 5,134,667 A * | 7/1992 | Suzuki | ............ | 382/164 |
| 5,144,686 A * | 9/1992 | Yumiba: Takashi et al. | .. | 382/263 |
| 5,696,850 A * | 12/1997 | Parulski et al. | ............ | 382/261 |
| 5,745,609 A * | 4/1998 | Nelson et al. | ............ | 382/264 |
| 5,886,797 A * | 3/1999 | Shimura | ............ | 382/266 |
| 5,912,744 A * | 6/1999 | Nakane | ............ | 358/447 |
| 5,978,522 A * | 11/1999 | Ishii et al. | ............ | 382/299 |
| 5,995,248 A * | 11/1999 | Katori et al. | ............ | 358/2.1 |
| 6,069,982 A * | 5/2000 | Reuman | ............ | 382/275 |
| 6,281,992 B1* | 8/2001 | Kondo | ............ | 358/501 |
| 6,678,424 B1* | 1/2004 | Ferguson | ............ | 382/286 |
| 6,728,003 B1* | 4/2004 | Gallagher et al. | ............ | 358/1.9 |
| 7,054,032 B2* | 5/2006 | Kato | ............ | 358/1.9 |
| 2002/0031257 A1* | 3/2002 | Kato | ............ | 382/165 |
| 2004/0081364 A1* | 4/2004 | Murphy | ............ | 382/260 |
| 2006/0239549 A1* | 10/2006 | Kelly et al. | ............ | 382/167 |
| 2007/0160278 A1* | 7/2007 | Fairbanks et al. | ............ | 382/128 |

OTHER PUBLICATIONS

C. Tomasi and R. Manduchi,"Bilateral Filtering for Gray and Color Images," Proc. Sixth Int'l Conf. Computer Vision, pp. 839-846, Jan. 1998.*

Morovic, "Gamut Mapping", University of Derby, U.K. pp. 639-682 (2003).

Balasubramanian et al., "Gamut Mapping to Preserve Spatial Luminance Variations", Xerox Research and Technology Webster, NY, pp. 1-6, 2001.

(Continued)

*Primary Examiner* — Kimberly A Williams
(74) *Attorney, Agent, or Firm* — Birch, Stewart, Kolasch & Birch, LLP

(57) ABSTRACT

A method and system for adaptively compensating for the printer MTF. The MTF compensation applied locally depends on the local mean: Several compensated High-pass images are computed for different mean values. Then locally, depending on the value of the low-pass band, one compensation high-pass value is selected for the final result.

7 Claims, 11 Drawing Sheets

OTHER PUBLICATIONS

Bonnier et al., "Compensating Printer Modulation Transfer Function in Spatial and Color Adaptive Rendering Workflows", Oce Print Logic Technologies, Intitute Telecom, Telecom Pris, LTCI CNRS, XP-002510571, pp. 1-6, Nov. 2008.

Bonnier, "Contribution AUX Algorithmes de mise en Correspondance de Gammes de Couleurs Spatialement Adaptatifs", Telecom Paris Tech, XP-002510561, pp. 1-3, Sep. 10, 2008.

Bonnier, et al., "Improvements in Spatial and Color Adaptive Gamut Mapping Algorithms", Institute Telecom, Telecom Paris Tech, LTCH CNRS, XP-002510573, pp. 1-6, Jun. 2008.

Bonnier, et al., "Spatial and Color Adaptive Gamut Mapping: A Mathematical Framework and Two New Algorithms", Department of Signal and Image Processing, XP-002472411, pp. 1-6, Nov. 2007.

Lindner, et al., "Evaluation of Characterization Methods of Printer MTF", Telecom Paris, Oce-PLT, XP-002510572, pp. 1-12, Jan. 2008.

Morovic et al., "A Multi-Resolution, Full-Colour Spatial Gamut Mapping Algorithm", Colour and Imaging Institute, University of Derby, pp. 282-287, Nov. 2003.

Morovic et al., "The Fundamentals of Gamut Mapping: A Survey", Colour and Imaging Institute, pp. 1-36, Jul. 2000.

Nakauchi et al., "Color Gamut Mapping Based on a Perceptual Image Difference Measure", Department of Information and Computer Sciences, Toyohashi University of Technology, pp. 280-291, Jul. 8, 1998.

* cited by examiner (a) Measured MTF (b) Corresponding compensation coefficients

COMPENSATION COEFFICIENTS

OVER-COMPENSATION COEFFICIENTS

Figure4: SCACOMP: p1offset (j=1) contributes to the shifting of (p*i*low+ α*i*p*i*high)toward the 0 grey point, unlike p2offset (j=2).

Figure 5: SCACLIP: ($p_{low} + a_ip_{high}$) is mapped toward 3 directions, the optimal direction will be chosen so that the local variations are best maintained.

Figure 6: In modified SCACLIP the direction of projection of each pixel is selected to preserve as much as possible the vectors p*iin* p*jin*.

METHOD, APPARATUS AND COMPUTER PROGRAM FOR ADAPTIVE COMPENSATION OF A MTF

CROSS-REFERENCE TO RELATED APPLICATIONS

This application is a Continuation of copending PCT International Application No. PCT/EP2008/062917 filed on Sep. 26, 2008, which designated the United States, and on which priority is claimed under 35 U.S.C. §120. This application also claims priority under 35 U.S.C. §119(a) on Patent Application No. 07117464.3 filed in Europe on Sep. 28, 2007 and 08305539.2 filed in Europe on Sep. 9, 2008. The entire contents of each of the above documents is hereby incorporated by reference into the present application.

BACKGROUND OF THE INVENTION

1. Field of the Invention

The invention relates to a method for preparing an image for printing on a printing device having a particular MTF in order to compensate for the MTF. The invention also relates to a system for preparing an image for printing on a printing device having a particular MTF in order to compensate for the MTF by mapping an original image from a source gamut color subsystem to a destination gamut color subspace belonging to a certain output device and having a particular MTF. The invention further relates to a computer program for performing the method and a computer readable medium for carrying out the program.

2. Description of Background Art

The ability of a system to reproduce details is captured in its Modulation Transfer Function (MTF): the MTF shows how much the system attenuates an input modulation signal. Generally an optical system tends to blur the details in the image and the MTF tends to decrease as the frequency increases. Further, it is the case that the MTF of a print+medium mostly is not as good as the MTF of a monitor. The technologies are very different and the lower MTF of the printing system is probably due to the halftoning algorithm and to the spreading of the ink on the paper.

It appears that the ability of the two systems (monitor versus printer+medium) to reproduce details are different, leading to strong differences in the perception of the spatial content in the resulting images. The ability of a system to reproduce details is captured in its Modulation Transfer Function (MTF), also called Spatial Frequency Response (SFR). The MTF shows how much the system attenuates an input modulation signal. Generally an optical system tends to blur the details in the image and the MTF tends to decrease as the frequency increases.

Characterization of the MTF has been popular in photography and there are a few methods to measure the MTF for both silver-halide and digital image capture devices, in which sinusoidal and slanted-edge targets are used. Yet until recently very little research has been published regarding the characterization of the MTF of printing systems.

The MTF affects color gamut changes between an original image and its reproduction via a given technology like printing, photographic imaging, electronic displaying, etc. These changes correspond to shape differences and size reduction of the gamut causing a loss of information. Ideally, a GMA should optimize the reproduction by taking into account the color and spatial distribution of the original image, such that the reproduction is perceived as similar as possible to the original. In the quest for an optimal reproduction, an impressive number of GMAs have been proposed in the literature. In "The fundamentals of gamut mapping: A survey" of J. Morovic and R. Luo an exhaustive survey has been presented. The ICC color management flow is based on the first generation, non-adaptive point-wise GMAs. Morovic classified these classic GMAs into two categories: gamut clipping and gamut compression. Gamut clipping algorithms project color lying outside the output gamut into its boundary. They usually preserve saturation, but clip image details and introduce clipping artefacts. Gamut compression algorithms compress the input gamut onto the output gamut and are better at preserving details but tend to reduce saturation.

In "Digital Colour Imaging Handbook, Chapter 10: Gamut Mapping" of J. Morovic, adaptive algorithms with the selection of an appropriate GMA depending on the image type or directly on the image gamut instead of the input device gamut have been investigated. To further improve adaptive GMAs, it has been advocated that preservation of the spatial details in an image is a very important issue for perceptual quality. GMAs adaptive to the spatial content of the image, i.e. Spatial Gamut Mapping Algorithms (SGMAs), have been introduced. These algorithms try to balance both color accuracy and preservation of details, by acting locally to generate a reproduction perceived as close to the original. Two families of SGMAs which follow different approaches may be distinguished: the first uses iterative optimization tools, the second reinserts high-frequency content in clipped images to compensate for the loss of details caused by clipping. The optimization family includes algorithms proposed in "Colour gamut mapping based on a perceptual image difference measure" by Nakauchi et al. Using models of perception of the Human Visual System (HVS), the algorithms minimize the perceived differences between the original and the candidate reproduction by locally modifying the candidate. In these optimisation loops, the main difficulty is to define an appropriate criterion to optimize, using a valid perceptual model. Another problem is the lengthy computing time, making these algorithms difficult to use in an industrial context. Algorithms of the second family are usually sufficiently fast to be implemented in an industrial color flow. They have a less ambitious motivation: to limit or compensate for the loss of details caused by clipping algorithms. Clipping yields good results in terms of saturation but tend to degrade image details in saturated areas. The projection might fail because it projects all non reproducible colors lying on the line of the projecting direction onto the same point on the gamut boundary. If in a local area, several neighboring pixels lie on the same line of projection but with distinguishable colors, the local variations that form the spatial content will be erased. Similarly, if pixels in a local neighborhood lie on nearby projection lines, they will be mapped to nearby points on the gamut hull, and the local spatial variations may be severely diminished. To prevent these degradations, for this second family of SGMAs improvements have already been proposed in the art. These improvements proposed so far can be divided in two groups. In the first group (XSGM), as disclosed in "Gamut mapping to preserve spatial luminance variations" by Balasubramanian et al., the original image is gamut mapped using a direction of projection that emphasises preservation of chroma over luminance. The parts of the original image that were clipped are high pass filtered and added to the gamut mapped image. The resulting sum is again gamut mapped using a direction of projection that emphasises preservation of luminance over chroma. Previously conducted psychophysical evaluations showed that this method obtains good scores but suffers from the presence of halos. In the second group, as disclosed i.e. in "A multi-resolution, full color spatial gamut mapping algorithm" by Morovic and Wang, it is proposed to first decompose the image in frequency bands. The low pass band is gamut mapped then successive clippings are performed during the reconstruction.

Results of such an approach depend both on the algorithm used in the image decomposition and on the GMAs successively applied. In both groups, problems may arise when adding high pass content to the gamut mapped image: artefacts such as halos and color shifts might be introduced.

As stated above a particular MTF will further deteriorate results in a color workflow for an output device where an original image has to be mapped from a source color subspace to a destination gamut color subspace, in particular when comparing output on a video screen with printed output.

SUMMARY OF THE INVENTION

In order to overcome the above problems, the method according to the preamble is improved in that the method comprises the step of adaptively compensating for the printer MTF, by applying MTF compensation in dependence of a first variable, comprising the steps of: calculating N compensated images for N values of the first variable; and, for each value of a second variable, the first variable being dependent of the second variable, determining a compensated value for the image according to the actual value of the first variable and the calculated N compensated images.

Since the MTF of a printer depends on the frequency and the bias (mean), each can be used as starting point for compensation.

A next embodiment is improved in that the first variable is a spatially local mean, the second variable is a spatial position in the image and a compensated image is a compensated High-pass image. This leads to the method where the method comprises the step of adaptively compensating for the printer MTF, by applying MTF compensation locally, in dependence of a local mean comprising the steps of: calculating N compensated High-pass images for N local mean values; and for each spatial position determining a compensated value for the image according to the local mean and the calculated N compensated high-pass images.

In this way, adaptively compensating for the printer MTF is realized. The MTF compensation applied locally depends on the local mean: Several compensated High-pass images are computed for different mean values. Then locally, depending on the value of the low-pass band, one compensation high-pass value is selected for the final result.

Since the MTF of a printer depends on the frequency and the bias, a locally adaptive compensation is proposed to take the local mean into account. N deconvolutions of $L_{high}$ are processed for the $MTF_n$ associated with N bias values. Then for each spatial position, a locally adaptive merging is processed according to the local mean. Objective measures show significant improvement and a psychophysical experiment did confirm this.

A next embodiment of the method according to the invention is improved in that the step of for each spatial position determining a compensated value for the image according to the local mean and the calculated N compensated high-pass images also comprises the step of obtaining missing MTF values by linearly interpolating for the frequency range of the image sent to the printer.

A further embodiment of the method according to the invention is improved in that the step of calculating N compensated High-pass images for N local mean values comprises the steps of: for each value of the local means transforming the image from a spatial domain to a frequency domain; dividing each obtained image in the frequency domain by a factor for the MTF; and transforming the images back to the spatial domain.

The invention further relates to a system according to the preamble characterized in that the system comprises: a filter for decomposing the original image in several bands, yielding at least a low pass image and a high pass image; a MTF compensation component for adaptively compensating for the printer MTF, by applying MTF compensation locally, in dependence of a local mean; and an adaptive merging and mapping component for merging and mapping the MTF compensated high pass image and the low pass image yielding an output image.

This locally adaptive compensation fits within the color and spatial adaptive workflow.

The notion of image that is used in appropriate cases refers to a set of pixels having values, where each value of a pixel has a value from a color subspace.

Regarding the notation of variables used in this application the following is remarked:

$I_{\overline{low}}$ is also indicated as $I_{lowM}$;

$I_{\overline{high}}$ is also indicated as $I_{highM}$;

in general the horizontal bar above a subscript corresponds with an extension of "M" indicating that the variable has been mapped;

L, C, h are also indicated with a star *; and for variables the subscripts and superscripts are in cases indicated as normal characters following the main character of the variable: Ilow is identical to $I_{low}$.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE EMBODIMENTS

Framework

Figure 1:
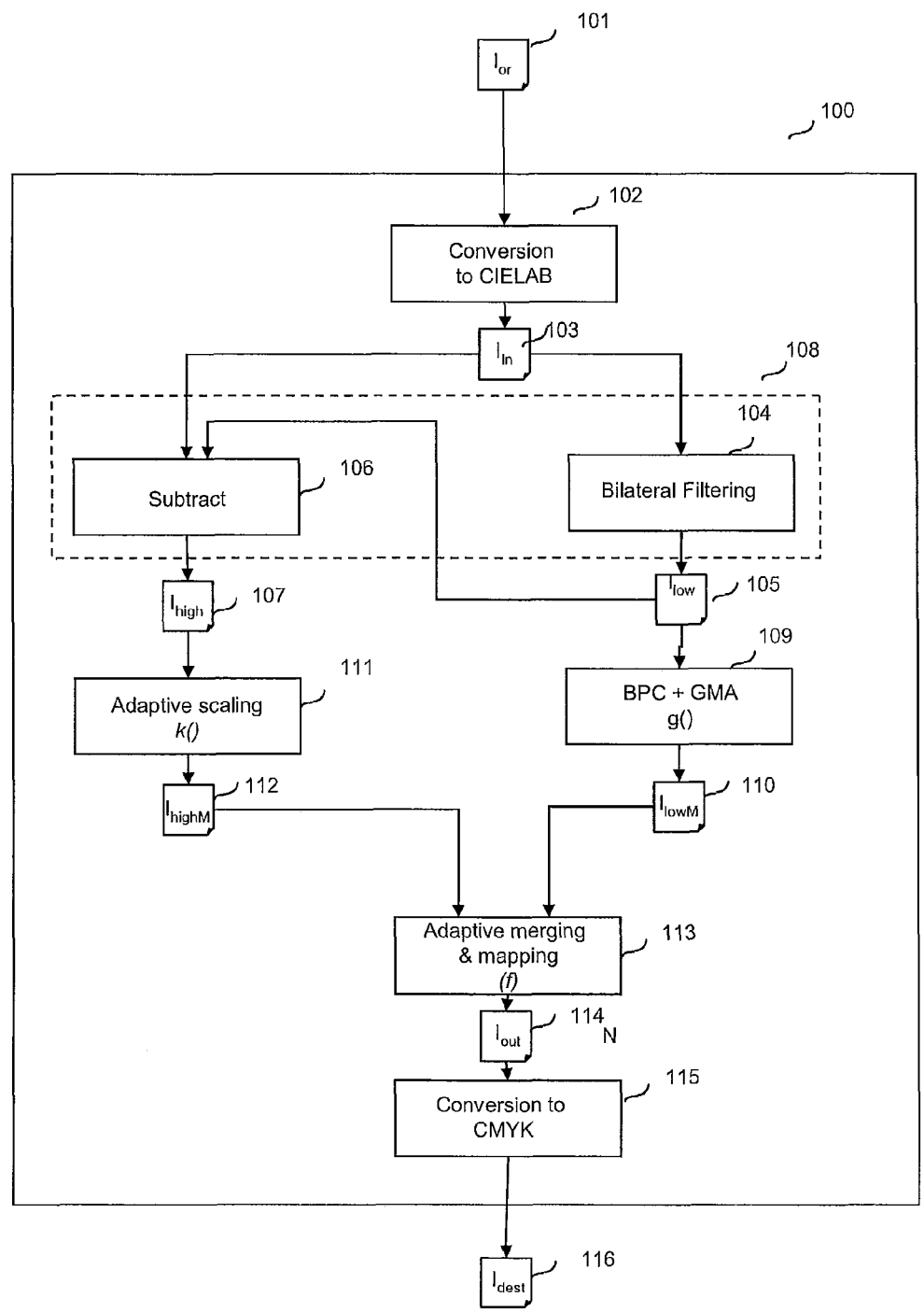
FIG. 1 shows a system for gamut mapping according to the invention.
Figure 2:
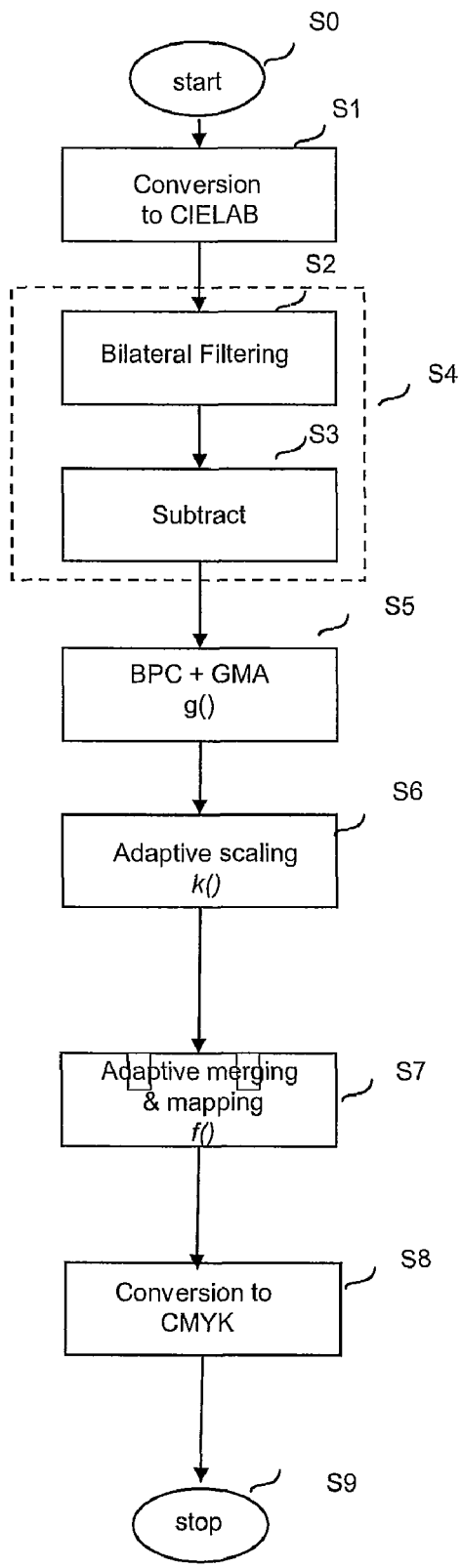
FIG. 2 shows a flow diagram representing an embodiment of a method according to the invention.

FIG. 1 illustrates a system 100 comprising a number of components making up a framework for adaptive gamut mapping according to the invention. In the framework images going from one component to another are indicated as a rectangular with a folded corner. The components, also referred to as modules, may be embodied as software components running under a certain operating system on a computer or they may be embodied in hardware as dedicated circuits like FPGLA's or the like. FIG. 2 provides a flow diagram representing an embodiment of a method according to the invention. Both diagrams are related in the sense that typically a particular component carries out a particular step of the method.

In step S1, executed by component 102, an original image $I_{or}$ (101) is converted to CIELAB color space, using the absolute intent of the input ICC profile and yielding $I_{in}$ (103).

In a next step S2, executed by component 104, a low pass band $I_{low}$ (105) is obtained from $I_{in}$ by Bilateral Filtering. In this step a weighted local mean is computed where each neighbor is given a weight, which is a function of both the geometric distance and the colorimetric $\Delta E_{ab}$ distance to the central pixel. This mean is computed using a five-dimensional bilateral filtering algorithm. The resulting low pass band $I_{low}$ (105) contains these weighted local means, where the weight is a function of both the geometric distance and the colorometric $\Delta E_{ab}$ distance to the central pixel.

In step S3, executed by component 106, the high pass band $I_{high}$ (107), comprising the local variations, is determined by taking the difference of $I_{in}$ and $I_{low}$.

Step S2 and S3 together, indicated as S4 and corresponding with modules 104 and 106, together indicated as 108, effectively decompose the image in several bands. In the embodiment illustrated so far the image is decomposed in two bands, one containing the local means, the other the local variations.

In a next step S5, corresponding with module 109, $I_{low}$ is mapped on the destination gamut DestGamut by clipping and Black Point Compensation is applied. This transformation will further be indicated by g( ). Note that degradation by clipping mostly occurs in a neighborhood in which several pixels have nearby color values. However the previous bilateral filtering in step S2 will prevent this: such a neighborhood will be blurred by the filter and the local variations will be safely preserved in $I_{high}$. This step provides as output $I_{lowM}$ (110).

In step S6, corresponding with module 111, a transformation k( ) is carried out on $I_{high}$ resulting in $I_{highM}$ (112).

In step S7, corresponding with module 113, a spatial and color adaptive gamut mapping algorithm is applied, further indicated as f( ) Due to the bilateral filtering carried out in step S2, the neighborhood of each pixel is taken into account in such a way that the color values of the pixels and their relations between neighbors are preserved. This yields $I_{out}$ (114).

Finally in step S8, corresponding with module 115, $I_{out}$ is converted to the CMYK encoding of the output printer using the relative colorimetric intent of its associated ICC profile. This yields $I_{dest}$ (116).

The application of this framework in a printing system will be discussed later.

The framework according to the invention will now be elaborated in more detail.

Color Space

In step S1 conversion to CIELAB is executed. It is noted that the color space in which a Spatial Gamut Mapping Algorithm is applied is of importance. In the embodiment presented CIELAB is chosen, however also CIEXYZ will be used.

Image Decomposition

The goal of the decomposition, carried out in module 108, is to set apart the local means and the local details of the image in order to process them separately and preserve both as much as possible in the resulting image. The framework presented decomposes the image in two bands, however by modification of module 108 the framework will be suited for n bands. The improvements in BPC and SCAGMAs are also suited to be applied with several bands.

Low Pass Filtering

Using Gaussian Filters for low pass filtering will result in halos. To avoid the introduction of halos, the decomposition is obtained by an edge preserving filter using 5D Bilateral Filtering (BF). The size of the filter is a crucial parameter and it will be discussed shortly. The number of frequency bands in the decomposition under consideration is 2, but may be more and a maximum will only be constrained by the cost of the computation time.

5D Bilateral Filtering (BF) in the CIELAB space is a combined spatial domain and color range filtering. Let $L_{BF}$=BF (L), $a_{BF}$=BF(a), $b_{BF}$=BF(b) denote the three channels of the filtered image. The $L_{BF}$ value of pixel i, $L^i_{BF}$, can be obtained as follows (similar expressions for $a^i_{BF}$ et $b^i_{BF}$):

$$L^{*i}_{BF} = \sum_{j \in I_{in}} w^j_{BF} L^{*j}$$

$$w^j_{BF} = \frac{d(x^i, x^j) r(p^i, p^j)}{\sum_{j \in I_{in}} d(x^i, x^j) r(p^i, p^j)}$$

where $I_{in}$ is the original image, $d(x^i, x^j)$ measures the geometric closeness between the locations $x^i$ of pixel i and $x^j$ of a nearby pixel j. $r(p^i, p^j)$ measures the colorimetric similarity between the colors $(L^i, a^i, b^i)$ and $(L^j, a^j, b^j)$ of pixels i and j.

In our implementation, $d(x^i, x^j)$ and $r(p^i, p^j)$ are gaussian functions of the Euclidean distance between their arguments:

$$d(x^i, x^j) = e^{-\frac{1}{2}\left(\frac{\|x^i - x^j\|}{\sigma_d}\right)^2}$$

$$r(p^i, p^j) = e^{-\frac{1}{2}\left(\frac{\Delta E^*_{ab}(p^i, p^j)}{\sigma_r}\right)^2}$$

where the two scale parameters $\sigma_d$ and $\sigma_r$ play an essential role in the behavior of the filter. These will discussed shortly. It is noted that equally parameters $\delta_d$ or $\delta_r$ may be used for characterization of the filter.

Figure 3:
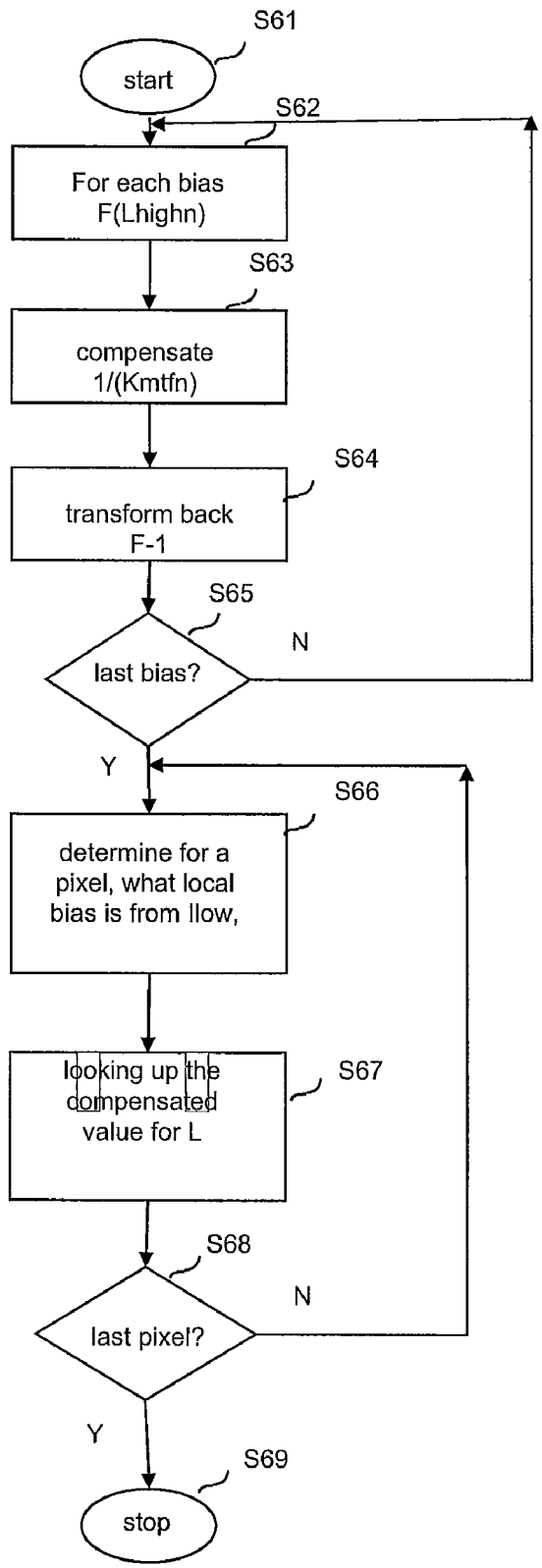
FIG. 3 shows a flow diagram for adaptive MTF compensation.

For the decomposition in two bands according to the invention, first, the original CIELAB image is converted to the polar representation CIELCH, i.e. lightness, chroma and hue. To compute the low-pass band $I_{low}$ only the two channels $L_{in}$ and $C_{in}$ of the original image $I_{in}$ are filtered using 5D bilateral filtering. This is illustrated in FIG. 3. The $h_{in}$ channel is not filtered, to keep the hue unaltered by the proposed SGMA. Nevertheless, since the 5D bilateral filter involves $\Delta E_{ab}$ distance, the hue will be well taken into account in the filtering of $L_{in}$ and $c_{in}$, channels.

The low pass band $I_{low}$ is thus defined as:

$$I_{low} = (L_{BF}, c_{BF}, h_{in})$$

where $L_{BF}$=BF($L_{in}$) and $c_{BF}$=BF($c_{in}$).

Filter Parameters, Spatial Filter Size

In classic gaussian filtering, the width of the gaussian filter (set by $\sigma_d$) determines the boundary between the lower frequency content going to the low-pass band (considered as local means) and the higher frequency content going to the high-pass band (local details). Setting the appropriate value for $\sigma_d$ is not a trivial task. This choice relates to the definition of 'local details' (i.e. small or minor elements in a particular area). This definition depends on multiple parameters such as the size and resolution of the reproduction, the modulation transfer function of the reproduction device, the viewing conditions, the distance of visualization and the behavior of the human visual system. It is known in the art to model the human visual system by multi-scale decompositions with more than two bands (usually up to five). By applying this now in the framework according to the invention it allows for the definition of several categories of details with different sizes. For the embodiment presented, the image decomposition is limited to two bands. Appropriate values for $\sigma_d$ and $\sigma_r$ for this embodiment will be discussed now.

Filter Sizes in 5D Bilateral Filter

In the 5D bilateral filter the $\Delta E_{ab}$ color distance between the central pixel and nearby pixels is also taken into account. This allows us to avoid halos and to handle specifically the local transitions between local similar pixels. Nearby pixels at small $\Delta E_{ab}$ distance (i.e. perceived as similar) are filtered. Pixels are less and less filtered as the $\Delta E_{ab}$ distance becomes large compared to $\sigma_r$. Thus $\sigma r$ determines a reference to set apart small $\Delta E_{ab}$ from large $\Delta E_{ab}$. While small $\Delta E_{ab}$ values are well correlated with perceived color differences, it is more difficult to define a threshold $\sigma r$ above which $\Delta E_{ab}$ values can be considered as large. One goal of the SCAGMAs is to preserve color differences that would otherwise be mapped by gamut mapping algorithms to the same color of the destination gamut. Thus to set $\sigma_r$, the average distance between the input and destination gamuts might be considered. The ability of the output device to maintain small differences between colors could also be taken into account. Given the lack of a straightforward definition for 'local details' and 'similar colors', we propose to review the previous work and to evaluate the impact of σd and σr values on the image decomposition.

Experiments carried out by the inventor brought forward the following observations:

A larger value of σd means a broader filter in the image domain, thus a larger set of frequencies being filtered. Indeed considering a column of images with increasing σd going from top to bottom, when browsing the images from top to bottom, one observes that $I_{low}$ becomes blurrier and $I_{high}$ presents more and more details. A larger value of $\sigma_r$ means a larger filter in the color domain, thus a larger range of color transitions being filtered. When $\sigma_r$ is very large, the bilateral filter is not modulated by the color content of the filtered area and the resulting blurring of the image becomes similar to the blurring of a two dimensional gaussian filter. It also leads to the introduction of halos near the strong edges. Viewing a row of images with an increasing $\sigma_r$, one finds more and more color content in $I_{high}$.

We now consider the relation between $\sigma_d$ and $\sigma_r$. A small value of $\sigma_r$ severely limits the blurring of the image to very small color transitions for any $\sigma_d$. A small value of $\sigma_d$ limits the blurring of the image to high frequency content for any $\sigma_r$. When both $\sigma_d$ and $\sigma_r$ have very large values, $I_{low}$ shows some color shifts due to a large boost of chroma in desaturated areas surrounded by saturated areas. These would cause trouble in the gamut mapping process, yet it only occurs for very large σ values.

Based on our observations, we find the values $\sigma_r=20\,\Delta E_{ab}$, and $\sigma_d=20$ pixels (i.e. approximately 1.5% of the diagonal) to be a good compromise which suits these algorithms and a set of appropriate images. Considering $\delta_d$ and $\delta_r$ as parameters, it is stated that the setting of $\delta_d$ should depend on the image size and the conditions of visualisation. In earlier experiments, we have set the values to $\delta_d=1\%$ of the image diagonal and $\delta_r=25\Delta E$ (for images printed at 150 dpi, at the size 9 cm-15 cm by 12 cm-20 cm, viewed at a distance of 60 cm).

In a particular embodiment these parameters, discussed above, may be set by a user via a user interface, or by a control program based on status and settings of the job and the system.

High Pass Filtering

The high pass band $I_{high}$ is then calculated in step S3, executed by module 106 in FIG. 1, by taking the difference of $I_{in}$ and the low pass $I_{low}$:

$$I_{high}=I_{in}-I_{low}=(L_{in}--L_{BF},c_{in}-c_{BF},0)$$

Function g( ) Applied to the Low Pass Band.

The step of applying Function g( ) to the low pass band (step S5, executed by module 109) will now be further elaborated.

Function g( ) acts on the local means of the input image $I_{in}$ contained in $I_{low}$. Its goal is to map the gamut of $I_{low}$ into the destination gamut Gamut$_{Destination}$, while preserving as much as possible the color attributes such as hue, lightness and chroma. It also needs to preserve global rendering.

In order to avoid consequent clipping of low-key values in the image, Black Point Compensation (BPC) is applied on $I_{low}$. Black Point Compensation (BPC) also referred to as linear XYZ scaling maps the source's black point to the destination's black point in the CIEXYZ color space, hence scaling intermediate color values. It is noted that Black Point Compensation can be considered as a gamut compression algorithm. As such, it produces images that are less saturated. This desaturation is not always welcomed and/or necessary. The method overcomes this disadvantage.

BPC significantly decrease the number of out of gamut pixels and the distance between the gamut and these pixels. Since the BPC in CIE XYZ scales down the gamut of $I_{low}$, boundaries of $I_{lowBPC}$'s gamut are closer to the destination gamut and the choice of initial clipping has less impact on the final results. In previous experiments some colorful images clipping artifacts were noticeable. These artefacts were due to the initial clipping using HPMinΔEab. However such artifacts are no longer an issue when applying the black point compensation first, and HPMinΔEab is appropriate to preserve the saturation:

$$I_{low}=HP\text{Min}HP\text{Min}\Delta E(I_{LowBPC})$$

The second step of function g( ) is the gamut mapping of the low-pass band. The goal of this mapping is to preserve as much as possible the color of each pixel in $I_{low}$. Preserving the color distance between neighbors is not as critical as when mapping the whole $I_{in}$, since most of the important details of the decomposed image have been filtered by the 5D bilateral filter and lie in $I_{high}$. These constraints lead to the use of HPMinΔE after BPC resulting in the clipped image $I_{lowM}$ where:

$$I_{lowM}=HP\text{Min}\Delta E(I_{lowBPC})=g(I_{low}),$$

$$g=HP\text{Min}\Delta E\cdot BPC.$$

Note that the hue channel is left unaltered by HPMinΔE: $h_{lowM}=h_{low}=h_{in}$. Since the BPC in CIE XYZ scales down the gamut of $I_{low}$, boundaries of the gamut of $I_{lowBPC}$ are closer to the destination gamut and the choice of initial clipping has less impact on the final results. The choice of HPMin$\Delta E_{ab}$ for gamut mapping is appropriate since it preserves the saturation and maintains the hue constant.

However in another embodiment (SCACOMP version) of our spatial and color adaptive GMA (see below function f( ), HPMin$\Delta E_{ab}$ is substituted by another clipping algorithm SCLIP clipping toward the 50% grey point in order to apply consistent locally adaptive compression that would not be consistent if using HPMin$\Delta E_{ab}$:

$$I_{lowM} = SCLIP(I_{lowBPC}) = g(I_{low}),$$

$$g = SCLIP \cdot BPC.$$

Function k( ) Applied to the High-Pass Band

The transformation k( ) comprises the step for MTF compensation according to the invention and a step for adaptive scaling.

The step for MTF compensation will be further explained now.

The Optical Transfer Function (OTF) fully describes the transfer characteristic of a system as a function of the spatial frequency. An OTF may be decomposed into a magnitude and phase function:

$$OTF(v_x, v_y) = MTF(v_x, v_y) PTF(v_x, v_y)$$

where $$MTF(v_x, v_y) = |OTF(v_x, v_y)|$$

$$PTF(v_x, v_y) = e^{-i2\pi \arg(OTF(v_x, v_y))}$$

where arg(x) is the argument (angle) of the complex number x and ($v^x$, $v^y$) are the spatial frequencies in the x- and y-directions of the plane, respectively.

The magnitude is known as the MTF and the phase as the Phase Transfer Function (PTF). In imaging systems, the phase component is typically neither captured by the sensor nor reproduced by a printing device. Thus, the most important measure with respect to imaging systems is the MTF.

The MTF of an optical system shows how much the system attenuates an input modulation signal (see figure V.1) and is defined as the ratio of the output amplitude $A_{out}(\xi, \eta)$ to the input amplitude $A_{in}(\xi, \eta)$:

$$MTF(f) = \frac{A_{out}(f)}{A_{in}(f)}$$

In order to describe a system, this ratio has to be measured for different frequencies. For a given orientation of the modulation signal the results can be plotted in a graph where the ratio is plotted versus the frequency. Such a graph shows a low pass behavior which is the typical case for an optical systems. An ideal output device would have an MTF constant at 1 for every frequency.

The MTF characterization of a printing system is not trivial: unlike digital capture devices, inkjet and laser printers are highly non-linear and therefore not easy to model. The MTF depends on different parameters related to the printing system and on the characteristics of the input images. In this section we consider the impact of the halftoning, addressability, dot size and quality of the medium on the MTF. This is also related to the Nyquest-Shannon sampling theorem. Usually a printing system has low-pass characteristics: mostly only high frequencies are attenuated and low frequencies are preserved.

Halftoning

There are many different types of printers which make use of different technologies to reproduce an electronic document on paper. Among this diversity, there are for example, toner-based printers (laser printers), liquid ink printers, solid ink printers. Inkjet printing is now the leading technology on the photographic printer market and in the following we only consider inkjet printers. An inkjet print-head projects ink drops onto the medium on demand. Combined with mechanical parts to move the printing head along one axis (fast scan) and the ability to move the medium along the second perpendicular axis (slow scan), the surface area of the medium can be covered by ink drops. Typical documents sent to an inkjet printer are continuous tone, where each color at any point is reproduced as a single tone, such as a digital photography with pixels coded on 8 bits (256) values per color channel.

An inkjet has to reproduce these continuous tone documents with color dots. These dots can vary in color (e.g. Cyan Magenta Yellow blacK, CMYK+Red+Green, CMYK+light Cyan+light Magenta+light grey) and sometime in size (e.g. 2 sizes, up to 64) for multi-level printers. Given the limited set of choices (e.g. 2 levels for a typical black and white printer: ink or no-ink), it is not possible to print continuous gray levels directly on paper. Since a continuous tone image often contains numerous intermediate levels, it must be processed before printing. The process of simulating a given color level with only binary values is known as halftoning. For doing so, the printer drops less ink per surface unit in a light gray zone than in a dark gray zone. There are many different halftoning techniques which can be divided in two groups. They both benefit from the fact that the human eye has a limited bandwidth and integrates locally over a certain surface. They differ in the way they modulate the quantity of ink (a) Amplitude Modulation—AM With this method, also referred to as analog halftoning, the dot size of each droplet is adapted to the desired output. Dots in darker areas are bigger than in lighter areas resulting in a darker appearance.

(b) Frequency Modulation—FM

With this method, also referred to as digital halftoning, the dot size is constant, the density of dots is used as a variable. The darker a zone shall appear the higher the density of dots. This is the method mainly used in inkjet printers. In both cases, the dot centers lie in a rectangular grid, their position is never changed. It is also possible to combine both methods. Since inkjet printers mainly use frequency modulation, amplitude modulation will not be considered during this study.

Frequency Modulation

It is not sufficient to know the right density which reproduces a certain gray level, but we also need to know for each position in the grid, whether to put an ink droplet or not. A simple threshold would eliminate all the variations of the image which take place either above the threshold value or beneath. A continuous gradient for example would result in a step function. This simple example shows that this simple method would provide poor results.

(a) Error Diffusion

Here, the value of each pixel is thresholded and the error which is thereby introduced is distributed to the neighboring pixels. One of the first and best known methods is the Floyd and Steinberg dithering.

(b) Masks

This method uses static pre-computed binary masks to binarize an image. For each gray level, there is a binary mask which holds the information as to where to put an ink droplet. For an image with a uniform gray level the halftoning result will simply be the corresponding mask itself. A common mask size is 32×32 pixels, which means, that the mask is in almost all cases much smaller than the image. Thus the same masks are used over and over again by repeating it horizontally and vertically.

This is like covering the whole image with many tiles of the same kind. The pixel value in the binarized image is the value of the mask, that corresponds to the gray value, at the same position. Since this method doesn't consider neighboring pixels, it can be parallelized, what speeds up the algorithm. The creation of the masks needs a lot of expertise to achieve good looking results, otherwise visual artifacts with the title periodicity may appear on graphical document.

Error diffusion algorithms have a larger bandwidth than the mask-based halftoning and are thus better suited to accurately reproduce high frequency content. However masks are more adapted to preserve the overall quality of photographic images as error diffusion introduces artifacts in these images. The printer in our experiments uses masks. Informal tests on a printer with CMYK+light cyan+light magenta+light grey inks show that the addition of light colors also has an impact on the MTF.

The term resolution is often used to describe the degree of visibility (or the perception) of details in a reproduction of an image. The MTF is related to the resolution, and depends on several printer's characteristics such as the printer addressability, the dot size, the medium and the halftoning algorithm. The addressability of a printing device is the number of uniquely identifiable locations for these dots per distance unit (e.g. one inch or one centimeter) in each direction. Typically an inkjet printer has a vertical and an horizontal addressability within the [150-720] dots per inch (dpi) range. The addressability is referred to as the resolution and used as a marketing tool to compare competing products. A typical printhead has a matrix of nozzles (e.g. 512×512 nozzles), the addressability depends directly on the distance between the nozzles on a printhead: to print 600 dots per inch, the distance between 2 neighboring nozzles must equal 1/600 inch, or 0.0423333 millimeters.

To achieve a higher addressability in the fast scan direction, it is possible to increase the frequency of the firing of ink drops relative to the cartridge speed. Alternatively some printers fire drops in several scans in order to claim higher number of dots per inch, yet the precision of the positioning of the drops is not sufficiently high to consider such drops as being on uniquely identifiable locations. Apart from the addressability, the size of the printed dot plays a significant role in perceived resolution of a printer. The size of the dots (precisely the surface of the dot on the medium) depends on the volume of the ink drops (typically 4-30 10-12 liters) and on the quality of the medium. On low quality paper the ink spreads and the surface is large, on higher quality the surface is smaller. Furthermore, for a same drop volume on plain uncoated paper, water based inks tend to produce a larger dot than hot-melt wax-based inks, hence the advantage of the latter technology. The size of the dot should be correlated to the addressability: for good solid-area quality (e.g. 100% black) the nominal drop size should be chosen so that it will spread on the medium to a spot 10% larger than the diagonal distance of the addressability spacing.

The resolution of a digital image is the number of pixels printed per distance unit (e.g. one inch or one centimeter) in each direction. Usually the resolution is considered as good when below the human perceptual threshold at 300 dpi (or more) in which case individual pixels are not distinguishable. In order to represent each image pixel in a continuous tone image, the image is halftoned, meaning the printer uses a pattern of several of its dots to simulate the color of each pixel in the image. To accurately reproduce 8 bits grayscale values, a matrix of minimum 16×16 dots is necessary (i.e. an image resolution of 1/16 of the addressability in dots). Therefore, 1 pixel in a continuous tone image will be printed on a 16/600 inch by a 600 dpi printer or 600/16=37.5 pixels per inch (ppi). In practice, an image resolution of 1/4 of the addressability (150 ppi for a 600 dpi printer) is considered as a good compromise between the preservation of the gradation and the reduction of the image resolution.

When measuring the MTF, the characteristics of the printing system such as the halftoning and the quality of the paper should be fixed; the halftoning algorithms transform grayscale or color continuous tone image to a halftone image with limited number of colors (e.g. a bi-level image ink/no ink).

Other parameters in the mechanics of the printer introduce also non-linear variations and noise. Given these non-linearities, a careful characterization should be conducted for several lightness, hue and saturation values. Spatial variations in different directions should also be explored using targets at several angles. Finally the characterization should include the reproducibility and the noise. Based on these observations, the characteristics of the input images to consider include:

its mean color or gray value (bias) and the amplitude of the modulation signal, the direction of spatial modulations or contours (horizontal, vertical or intermediate angles), the content of pixels printed just before (printed value could depend on previous print head actions).

The method used by the inventors for characterization of the MTF consists of printing patches with sinusoidal patterns, scanning them and comparing their amplitudes with the values of constant tone patches. The value of these constant tone patches correspond to the maximum (max), the mean (bias) and the minimum (min) of the sinusoidal patches in the same row.

One row of the test image consists of these three constant tone patches followed by nine sinusoidal patches oscillating between the min and max value with frequencies set to {10, 20, 30, 40, 50, 60, 80, 100, 150} cycles per inch respectively. To measure the MTF with different biases, the test image consists of 19 rows. The biases of the 19 rows are the RGB tone levels in $$\{\lfloor k \times 255 \rfloor | k=0.05, 0.10, 0.15, \ldots, 0.95\}=\{13, 26, 38, \ldots, 242\}$$

where $\lfloor x \rfloor$ is the nearest integer to x. The amplitude is set to 13, in order to avoid clipping of the signal. The bias level varies across the different rows.

The test chart is slightly modified: the bias values are equidistantly distributed in CIEXYZ, a colorimetric space better suited to characterize printers. Furthermore, the amplitude of modulation of the sine waves is increased to deltaY=20 (except for the extreme bias values to avoid clipping of the signal) to lessen the influence of noise in the measurement.

Figure 4:
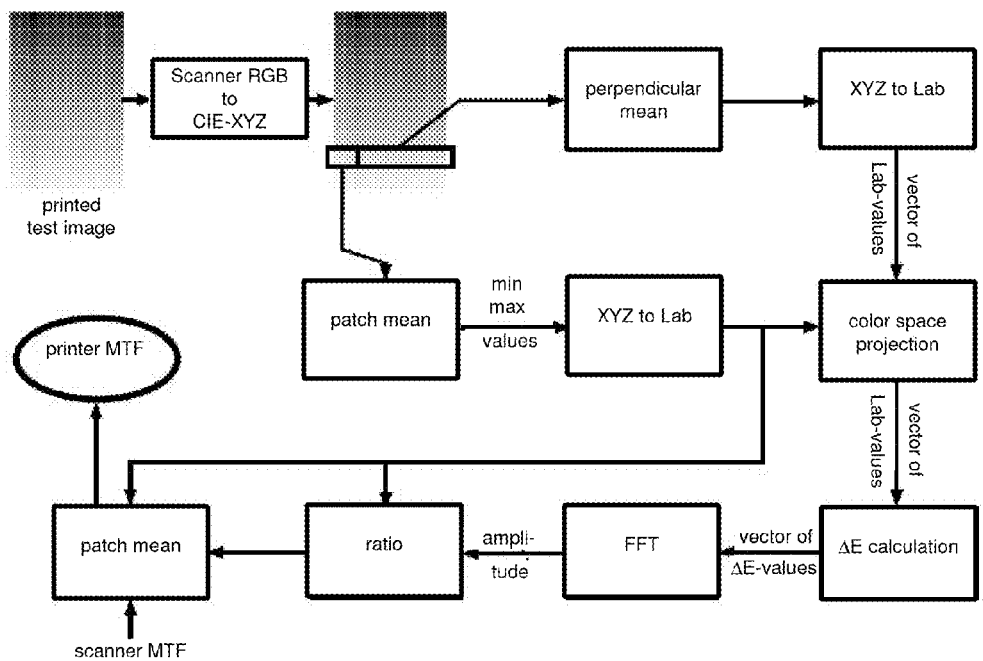
FIG. 4 shows a flow diagram for characterizing the MTF of an output apparatus.

The analysis is visualized in FIG. 4 and can shortly be described as follows. We first scan the printout. Then each row with constant mean gray level (bias) is processed separately.

(a) Within one row the three constant tone patches are processed first. Their means are calculated in the CIEXYZ space and converted into CIELAB values.

(b) The nine sinusoidal patches from the same row are extracted separately, averaged perpendicularly to the direction of modulation. The mean converted to CIELAB values and projected on the line which connects the upper and lower mean values of the constant patches.

(c) Then, for all the projected points on the line the $\Delta E_{ab}$ distance to the lower mean value of the constant patches is calculated. The result is a vector of scalar $\Delta E_{ab}$ values which is Fourier transformed in the next step and the amplitude of the corresponding main frequency of the patch is read.

(d) The amplitude is compared with the $\Delta E_{ab}$ distance between the constant min and max tone patches and it should normally be smaller. Since the scanner is not compensated at this point, their ratio is not yet the printer MTF. It is the MTF of the system composed by both the printer and the scanner.

(e) For the scanner compensation we use the scanner MTF which has been separately measured with specific engraved patterns on a physical chart [ISO 16067-1, 2003]. We then estimate how much the scanner attenuates a signal which oscillates between the min and max constant tone patches. This scanner ratio should be between 1 and the ratio calculated in the previous step. Dividing the first calculated combined printer and scanner ratio by the above scanner ratio provides the estimated compensated printer MTF.

It is observed that horizontal and vertical MTFs are slightly different, probably due to the mechanical design of the inkjet printer with two major directions: the direction of the paper transport (vertical) and the direction of the moving print head (horizontal). The MTF decreases as the frequency of the sine wave increases, as expected, but the MTF depends also on its bias, or mean value: the MTF values are higher for medium gray levels than for high gray levels (high row indices) and slightly higher for low gray levels (low row indices). Furthermore, results obtained proved that the attenuation of a printed sinusoidal signal depends on its bias value. The slanted edge method doesn't provide a measurement of this dependency and our attempt to modify the slanted edge method by printing a step with reduced contrast just resulted in strongly noised results. Thus the method is in favor of a more exhaustive measurement of the printer.

Conclusion is that the printer's MTF depends on numerous factors. Extensive measurement with varying values of bias, orientation and frequency is needed to characterize the MTF of a printer. Resulting measurements show that the MTF depends on bias level, orientation and frequency.

The initial aim of our research related to the printer's MTF is to be able to compensate for the Printer's MTF by pre-processing the image sent to the printer: printer compensation must occur in pre-processing. Aim is to amplify the frequencies by a factor given by the system MTF.

Under the assumption of a linear system, the degradation can be described by a multiplication in the Fourier domain: Assuming an input image $I_{in}$, its Fourier transform being $F(I_{in})$ and the system's MTF named $K_{MTF}$, the fourier transform of the degraded image at the output is $F(I_{out})=K_{MTF} \cdot F(I_{in})$. In the case where $K_{MTF}$ is known, the compensation is a simple division and the compensated input image $F(I_{comp})$ in the Fourier domain is then:

$$F(I_{comp})=F(I_{in})/K_{MTF} \quad (V.5)$$

This is also known as deblurring or as a deconvolution since it is the inverse of a convolution in the spatial domain. Unfortunately this ideal case might be perturbed by noise. The system's MTF has to be estimated by a measurement which itself is affected by noise. This is mostly problematic for frequencies where the system's attenuation is strong. Furthermore, the image $I_{in}$ might also contain noise. Different filters have been proposed to take the noise into account.

The Wiener filter named after his author [Wiener, 1949] is a modification of the division above taking the noise into account. It is done by dividing through the sum of the MTF and a noise-to-signal ratio:

$$F(I_{comp}) = \frac{F(I_{in})}{K_{MTF}} \frac{K_{MTF} K^*_{MTF}}{K_{MTF} K^*_{MTF} + NSR}$$

where:
$I_{in}$ is the image which has to be compensated,
$I_{comp}$ is the compensated image,
$K_{MTF}$ is the MTF of the system and $K^*_{MTF}$ its complex conjugate,
NSR is the noise-to-signal ratio of the image $I_{in}$.

When the noise tends to zero, the Wiener filter becomes the above division in equation V.5. But the more noise there is in the image, the less is the filter's impact. The Wiener filter is a product of a simple division by the degradation filter $K_{MTF}$ and a correction factor which depends on the noise. The estimation of the noise-to-signal ratio NSR might be problematic, as a printer can get an input image from any source (camera, scanner, software, . . . ) and every device has its own noise characteristics.

There is a variety of other possibilities to compensate a convolution kernel using different techniques. One issue with all these advanced methods is that they tend to use more calculation time and storage than the simple division from equation V.5. Preliminary tests showed that the simple division gives satisfying results, mainly due to the fact that the measured MTF values are mostly greater than 0.5. Therefore in the proposed embodiment we will use the simple division.

As our aim is to include the compensation of the MTF in the spatial and color adaptive workflow, in the following sections we show how to embed the compensation within the framework proposed. A new compensation algorithm based on image decomposition is proposed to locally adjust the compensation given the local mean.

In order to use the MTF data gathered in the previous section, it might be necessary to extrapolate missing extreme values. In our experiment, the printing resolution is 600 dpi but the images are printed at 150 dpi, also the highest measured MTF value. Furthermore, the lowest measured frequency is 10 cycles per inch, and in our experiment, we set to 1 the MTF values between 0 and 10 cpi. For simplicity and calculation speed we propose to embed the division in the Fourier domain (eq. V.5) within the existing framework.

The MTF values have been measured for sine-wave modulations in the CIEXYZ space as it is more related to the physics of the printing system. Yet the SCAGMA workflow is using the CIELAB color space and the division is applied in CIELAB. Since the Human Visual System (HVS) is more sensitive to luminance high frequency content than chrominance high frequency content, we propose to limit the deconvolution to the L*high channel.

One key aspect of the proposed SCAGMAs is the decomposition of the image in two bands obtained by 5D Bilateral Filtering (BF) in the CIELAB space. While the deconvolution can be applied before the image decomposition, we propose to apply it to the $L_{high}$ channel of the high pass band to avoid halos: $L_{high}$ does not contain the sharpest edges of the input image Deconvolution is inserted within the function k of the workflow.

After the decomposition of the image $I_{in}$ with the bilateral filter $L_{high}$, the L channel of the high frequency band $I_{high}$, is selected. This channel is then transformed into Fourier space, divided through the printer MTF and transformed back. These steps are included in the function k. Then the image is recomposed by the adaptive merging and mapping embedded within the function f ( ).

Figure 9:
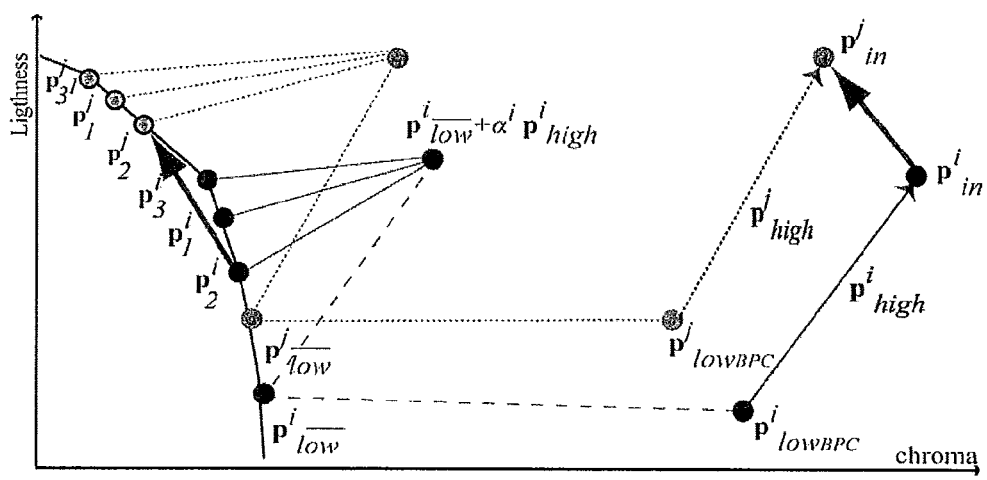
FIG. 9 shows an improvement of a mapping.

The MTF values vary as a function of the mean gray level: MTF values in the highlights significantly differ from the ones in the mid-tones and the shadows. In preliminary tests, we attempted to use the mean of MTFs over the gray bias. Consequently, the measured compensated MTF were too low (under-compensated) for light gray patches and too high (over-compensated) for dark gray patches. According to the invention we propose to take the local gray level dependency into account when compensating for the printer's MTF: each pixel in $L_{high}$ is compensated according to the local mean in $I_{in}$.

$$L_{highcomp}{}^* = K_{comp}(L_{high}{}^*, L_{in}{}^*, \text{MTF})$$

where $L_{highcomp}$ is the compensated L channel and $K_{comp}$ the locally adaptive compensation (see also FIG. 9).

The method for compensating a MTF will now be described stepwise with reference to FIG. 3. A local measure of the mean gray level $L_{in}$ is needed to achieve locally adaptive compensation. Here we can take full advantage of the image decomposition and use $I_{low}$ as an estimation of the local mean. Notice that values in $I_{low}$ are obtained by bilateral filter, this is an advantage as a local mean computed for a local detail $I_{high}$ should only be computed by using local and similar gray pixels.

Since the MTF was measured using modulations and bias values based on the CIE XYZ color space, in step S61 of FIG. 3, $I_{low}$ is converted to CIE XYZ and $Y_{low}$ is taken as the local mean.
The MTF has been measured for the bias values $$b \in B = \{b_1, b_2, \ldots, b_N\}$$

Let MTFb(f) denotes the MTF value for bias b and frequency f. $L_{high}$ can be divided through each MTFb(f) in the Fourier domain which results in N compensated high pass images in the Fourier domain $$F(L^*_{highh_1}), \ldots, F(L^*_{highh_N}):$$

$$F(L^*_{highh_n}) = \frac{F(L^*_{high})}{K_{MTF_n}}$$

where
where $L_{highnM}$ is the compensated image in the image domain for bias value n.
So, in step 62 for a first b
$F(L_{high}{}^*)$ is determined
This value is compensated in step S63:

$$F(L^*_{highh_n}) = \frac{F(L^*_{high})}{K_{MTF_n}}$$

The resulting value is transformed back in step S64.

In step S65 it is checked if compensation has been calculated for all bias values N. If not (N) the method continues with step S61. If so (Y), the method continues with step S66.

In step 66 for a first pixel of the image it is determined what the value for the local bias is from $I_{low}$. In next step S67 the compensated value for L associated with the determined bias value is determined. In step S68 it is tested if a next pixel is available. If so (Y) the method continues with step S66. If not (N) the method continues with step S69, where the method returns to the main routine k( ).

In this way a locally adaptive merging can be processed for each pixel according to the local mean. The N compensated high pass bands $L_{highM1}, \ldots, L_{highMN}$ are merged to one single compensated high pass band $L_{highcomp}$. Since only certain MTF values have been measured for a limited set of bias and frequency values, missing MTF values are linearly interpolated for the frequency range of the image sent to the printer ([0, 150] dpi in our experiments). Then for each spatial coordinate (x, y) in $I_{high}$ the two bias levels b∈B closest to the value $Y_{low}$ are selected. $L_{highcomp}$ is a linear interpolation between the compensated images $L_{highMn}$ at these two bias levels:

$$L_{highcomp}{}^* = w \cdot L_{high[Y_{low}]_B} + (1-w) \cdot L_{high[Y_{low}]_B}$$

with $$w = \frac{Y_{low} - \lfloor Y_{low} \rfloor_B}{\lceil Y_{low} \rceil_B - \lfloor Y_{low} \rfloor_B}$$

where the operators $\lfloor Y \rfloor_B$ and $\lceil Y \rceil_B$ denote the closest bias level b∈B smaller and greater than Y respectively.

After this locally adaptive compensation, the resulting image is recomposed:

$$I_{highcomp} = (L_{highcomp}, C_{high}, h_{high}).$$

Figure 5:
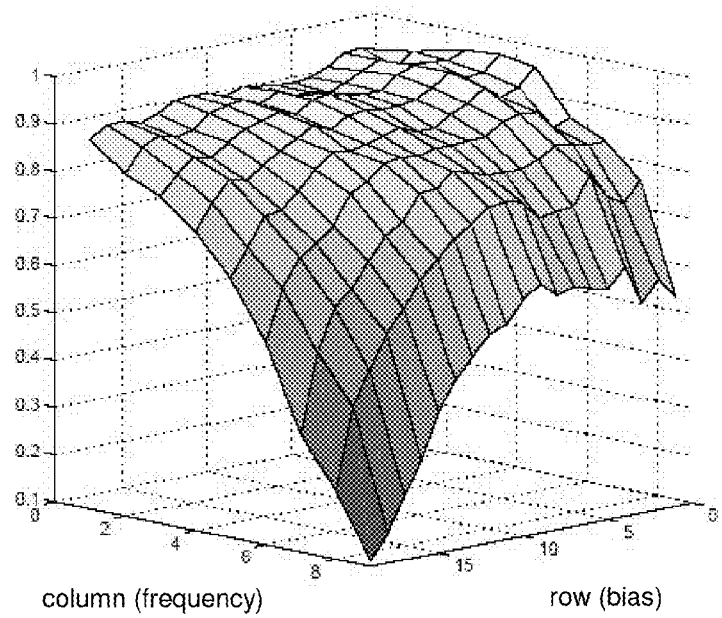
FIG. 5 shows graphs with measured MTF's and compensation factors.
Figure 5:
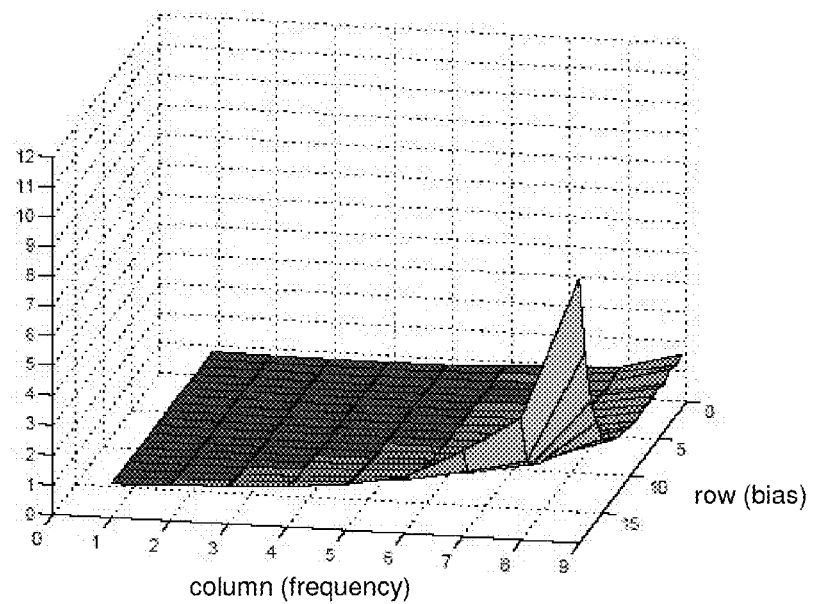

FIG. 5 shows a graph with a measured MTF and corresponding compensation coefficients. In the method proposed so far the compensation of the MTF is based on objective measures by mean of a scanner. While according to the scanner-based measured objective results, the MTF compensation has achieved its goal, preliminary evaluation of the printed images by observers lead to interrogations about the amplitude of the perceived improvement. To further enhance the perceived quality of the reproduction, in a variant of the previous embodiment it is proposed to overcompensate the MTF. In this scenario, the MTF of the printing system is compensated for more than necessary and a stronger local contrast should be perceived in the resulting images. Such images could show better preserved local details and thus be judged as more accurate reproductions. Overcompensation depends on the perception of the HVS. Several operators can be applied to over-compensate the MTF:

A global shift, it might have a stronger impact on high-frequency content as the compensation applied on high-frequencies is stronger than the one applied in lower frequencies.

A global scaling factor in the range [1,∞[, in the other hand, might lead to a stronger impact on lower frequencies, as it will lead to a compensation of frequencies where the MTF is close or equal to 1.

A frequency dependent function, for example a power applied to the compensation coefficients might have an appropriate behavior.

Figure 10:
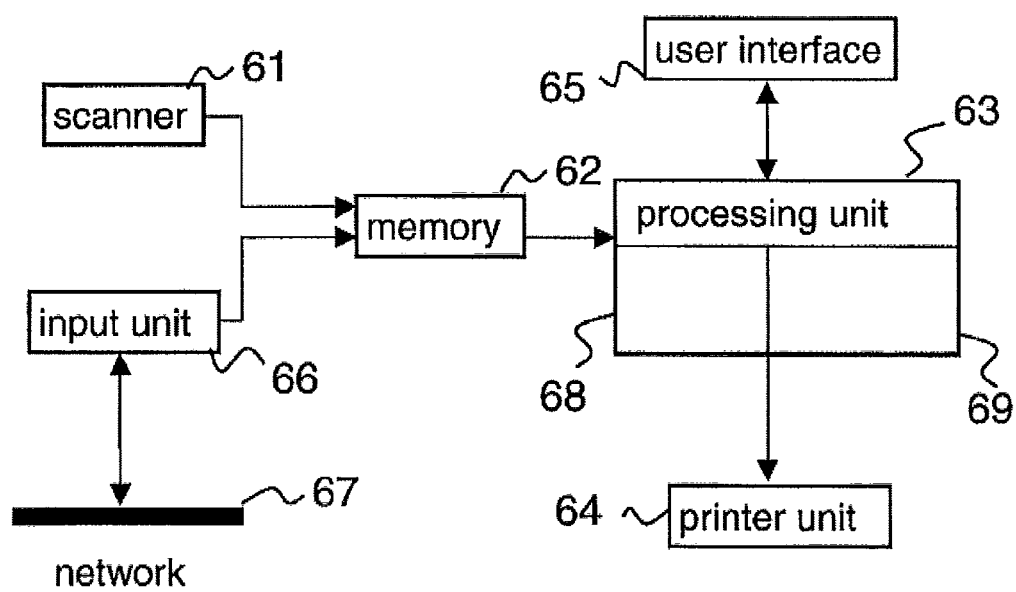
FIG. 10 is a simplified component diagram of a printing apparatus for use in connection with the invention.
Figure 11:
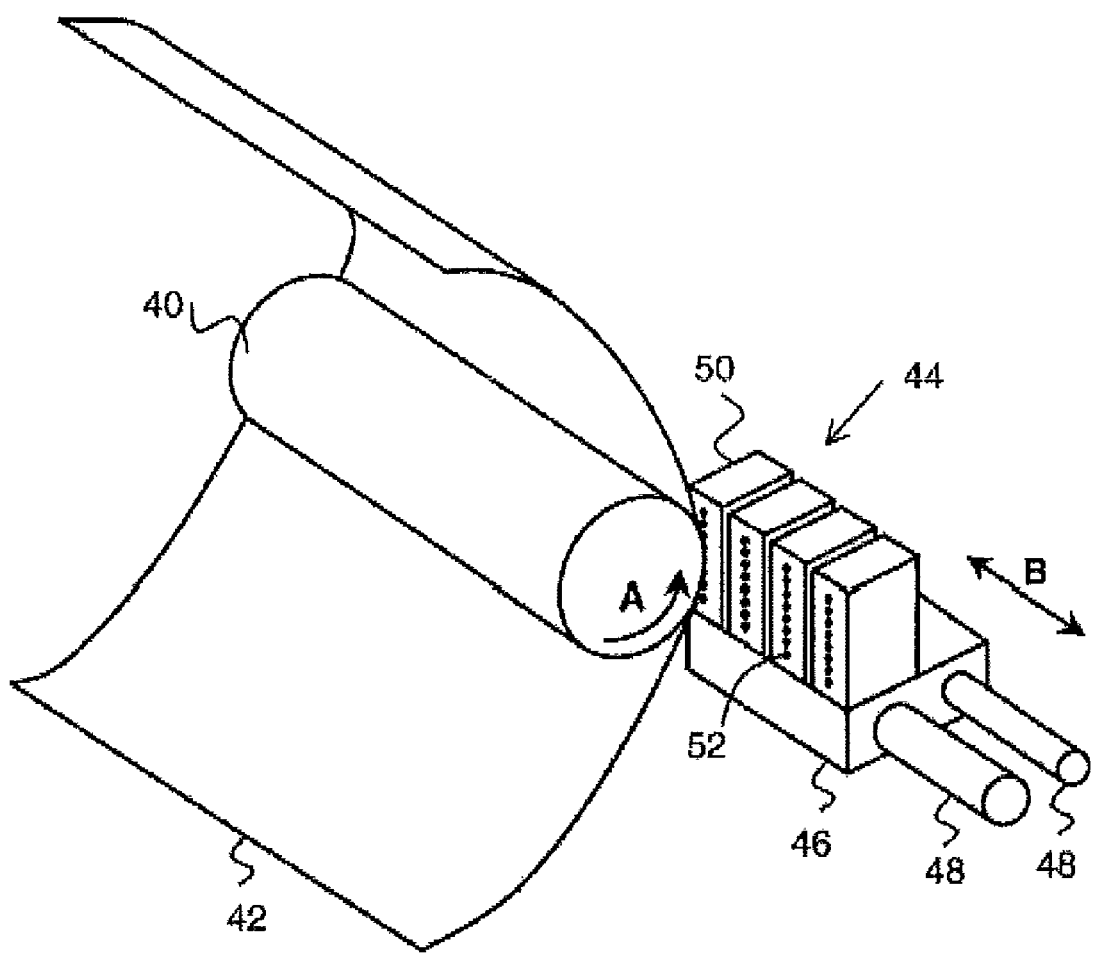
FIG. 11 is a diagram showing essential parts of an ink jet printer to which the invention is applicable.

The inventor found out that a global scaling factor has a stronger perceived impact. In our test, we have thought of over compensating as an underestimation of the printer's MTF. An underestimation of 80% of the MTF, obtained by multiplying each MTF value by 0.8 has been selected for its perceptually satisfying results (see FIG. 10).

Experiments turned out that printed over-compensated images appear to have a better preserved local contrast when compared to non-compensated and compensated reproductions of the same images.

Figure 6A:
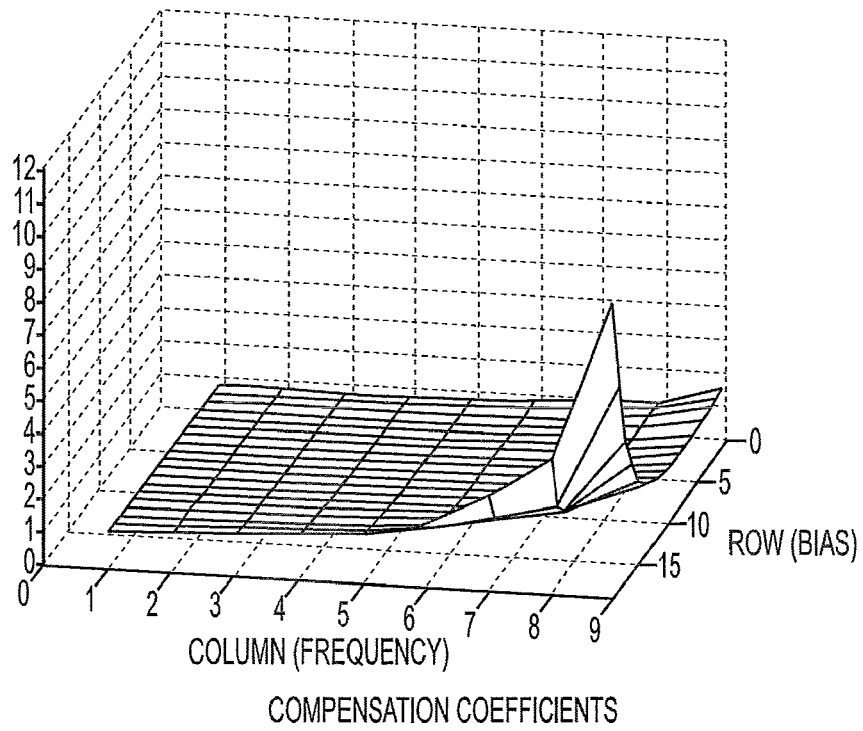
FIG. 6 shows graphs with over-compensation coefficients.
Figure 6B:
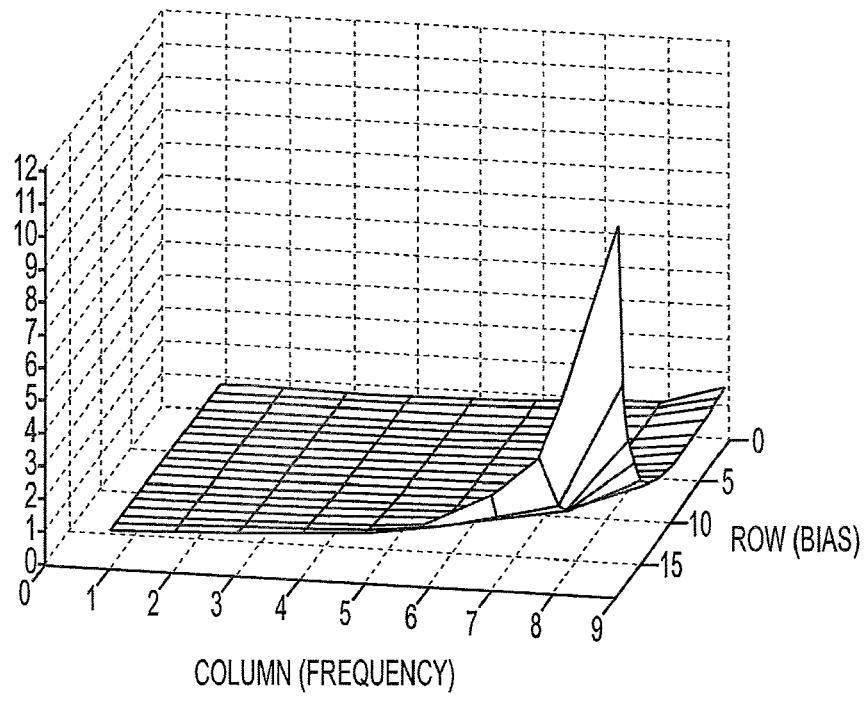

FIG. 6 shows compensation coefficients and over-compensation coefficients.

This ends the discussion of the embodiments for compensating a particular MTF.

Then the SCAGMA process is resumed: Compensation is part of function k( ) and is applied before the adaptive compression α.

The step of adaptive scaling, step S6 of FIG. 2, executed by module 111 of FIG. 1, will now be worked out further. When image areas of $I_{low}$ have been greatly modified into $I_{lowM}$ by the clipping, the local energy within $I_{lowM}$ may substantially be reduced compared to the local energy within $I_{low}$. In the image areas where both $I_{low}$ and $I_{high}$ have large local energies but $I_{lowM}$ has lost a part of its local energy, it might be wise to reduce the energy of $I_{high}$ to form $I_{highM}$ to maintain a balanced ratio between the contributions from the two bands $I_{lowM}$ and $I_{highM}$, similar to the ratio between $I_{low}$ and $I_{high}$. Therefore we introduce α(i, $I_{low}$, $I_{lowM}$) a local variable affecting the amount of Ihigh being added to $I_{lowM}$ during the merging at each pixel i:

$$I_{highM} = \alpha \cdot I_{high},$$

or equivalently:

$$p_{high}^i = \alpha^i \cdot p_{high}^i,$$

$$\alpha^i = \min\left(\sum_{j \in I_{in}} w_{BF}^j \frac{\|p_{low}^j - p_{low}^i\| + \varepsilon}{\|p_{low}^j - p_{low}^i\| + \varepsilon}, 1\right),$$

where ε is a small constant value to avoid dividing by zero if $p'_{low} = p'_{low}$ and $w^j_{BF}$ are the weights of the bilateral filter used in the decomposition of the image. Preferably ε=0.001.max (|plow|). α is taken into account in the modified versions of SCACOMP and SCACLIP. Notice that α is less critical when Black Point Compensation is applied to $I_{low}$ as the local structure of the low-pass band is then better preserved and α is often close to 1.

In a particular situation α=1 and $I_{high}=I_{highM}$.

Adaptive Merging and Mapping of the Two Bands, Function f( )

The two bands $I_{low}$ and $I_{high}$ have been modified by g( ) and k( ) respectively, and at this point, $I_{lowM}$ and $I_{highM}$ can be merged and then mapped (step S7 and module 113). In this step, the mapped low pass image $I_{lowM}$ and the high pass band image $I_{highM}$ are merged.

The merging operator is an addition, as simple as the decomposition operator:

$$I_{temp} = I_{lowM} + I_{highM}.$$

Although more elaborated merging is also possible, since function k performs as a locally dependent weight similar to that of an adaptive merging a simple addition for merging suffices for the framework presented.

Since colors in $I_{temp}$ might lie outside the destination gamut $Gamut_{Dest}$, a second gamut mapping is necessary. Unlike the mapping of $I_{low}$, this mapping needs to preserve details and should therefore adapt to the content of $I_{temp}$.

The bilateral filter (module 104, step S2) filters low color variations and maintains high color variations (i.e. strong edges). According to these properties, local spatial variations contained by $I_{highM}$ present only low color variations. Therefore, each pixel and its neighbors are more likely to be projected to a same little area of the gamut boundary if f( ) is a clipping GMA. This would result in a strong diminution of the variations present in $I_{high}$. To avoid this situation, f( ) and also k( ), may be locally adaptive functions with the following objectives for a pixel $p_{out}$ of the resulting image $I_{out}$:

$p_{out}$ is as close as possible to $p_{in}$ of $I_{in}$, the color variations of $p_{out}$ with its neighbors are the closest to the color variations of $p_{in}$ with its neighbors, $$\bullet P_{out} \in Gamut_{Dest} \cap \wp(\text{plane of constant hue } h_{in} \text{ of } p_{in})$$

Since the first two requirements might be antagonistic, $p_{out}$ results of a compromise. A weighted sum can be used here:

$$\begin{cases} p_{out} \in (Gamut_{Dest} \cap \wp), \\ p_{out} = \arg\min_{p} \left[ w\Delta_1(p, p_{in}) + (1-w)\Delta_2(p_{high}, p_{\overline{high}}) \right], \end{cases}$$

where w∈[0, 1] is a weight and Δ1, Δ2 are distance metrics (several metrics are available in this context).

If w=1, k becomes minimum Δ1 clipping (k=HPMinΔE if Δ=ΔE*ab).

If w=0, only the color variations between the pixel and its neighbors will be preserved, not the pixel value.

In intermediate cases w∈]0, 1[, the result might be obtained by an optimization algorithm.

Fast solutions can be deployed to maintain the computational time at a reasonable level. A tradeoff of computation time versus quality of the result has to be taken into account. In the next sections, two alternative and fast embodiments are proposed that provide approximations of the best obtainable results. They are based on the same framework: decomposition in two bands $I_{high}$ and $I_{low}$ using 5D bilateral filtering, followed by a clipping of the low-pass band $I_{low}$ into $I_{lowM}$ and a locally adaptive scaling of $I_{high}$ into $I_{highM}$. Then $I_{highM}$ and $I_{lowM}$ are merged and adaptively mapped by using a local adaptive implementation of the two families of pointwise GMAs: compression and clipping.

Spatial and Color Adaptive Compression (SCACOMP)

According to a particular embodiment an adaptive compression algorithm to preserve the color variations between neighboring pixels contained by $I_{highM}$ is used. The concept is to project each pixel lying outside GamutDest toward the center, more or less deeply inside the gamut depending on its neighbors (FIG. 6).

First, $I_{highM}$ is added to $I_{lowM}$ and the sum $I_{temp}$ is mapped using SCLIP:

$$I_S = SCLIP(I_{temp}) = SCLIP(I_{lowM} + I_{highM}).$$

Then we compute the difference Ioffset between $I_S$ and the newly constructed image $$I_{temp} = (I_{lowM} + I_{highM}):$$

$$I_{offset} = I_S - I_{temp} = I_S - (I_{lowM} + I_{highM}).$$

At the given spatial position $x^i$, for each pixel j in the neighborhood, we project the color vector $p^j_{offset}$ on the direction of $p^i_{offset}$. If the result is greater than the norm $\|p^i_{offset}\|$, $p^j$ is taken into account and pushes $p^i_S \in I_S$ toward the 50% grey point of GamutDest (FIG. 6). Each neighbor's contribution to the shifting of pixel i is weighted by $w^j_{BF}$ defined by the Bilateral Filter BF:

$$w_{BF}^j = \frac{r(x^i, x^j)s(p^i, p^j)}{\sum_{j \in I_{in}} (r(x^i, x^j)s(p^i, p^j))}$$

and $$p_{out}^i = (p_{\overline{low}}^i + p_{\overline{high}}^i) + w_{shift}^i p_{offset}^i,$$

where:

$$w_{shift}^i = \sum_{j \in I_{in}} w_{BF}^j \max\left(\frac{p_{offset}^j \cdot p_{offset}^i}{\|p_{offset}^i\|^2}, 1\right),$$

where "●" denotes the scalar product. $w_{shift}^i$ is superior or equal to 1, guaranteeing therefore that the resulting color value lies in the gamut, between the gamut boundary and the 50% grey point of $Gamut_{Dest}$.

In a variant of the embodiment of SCACOMP each neighbor's contribution is controlled by $w_{shift}^i$:

$$p_{out}^i = SCLIP(p_{\overline{low}}^i + \alpha^i p_{high}^i) + w_{shift}^i p_u^i,$$

where $p_u^i$ is the unit vector toward 50% grey, $$w_{shift}^i = \sum_{j \in I_{in}} w_{BF}^j \max(p_{offset}^j \cdot p_u^i - |p_{offset}^i|, 0),$$

$$p_{offset}^i = SCLIP(p_{\overline{low}}^i + p_{\overline{high}}^i) - (p_{\overline{low}}^i + p_{\overline{high}}^i),$$

and where "●" denotes the scalar product.

As $w_{shift}^i \geq 0$, the resulting color value lies in the gamut, between the gamut boundary and the 50% grey point of GamutDest. This variant prevents numerical imprecisions which could arise with very small values of $|p_{offset}|$.

Spatial and CCOLOR Adaptive Clipping (SCACLIP)

According to a second embodiment, in order to maintain the content of $I_{high}$, the direction of the projection is set as a variable: for each pixel the optimal mapping direction will be chosen so that the local variations are best maintained.

To get faster results, the choice is restricted to a set of directions. In the proposed second embodiment, the mapping direction will be chosen within directions known in the art, i.e. between $f_1$=HPMinΔE, $f_2$=CUSP and $f_3$=SCLIP. First, $I_{highM}$ is added to $I_{lowM}$ and the 3 mappings $f_n$, n∈{1, 2, 3}, are run (see FIG. 7). Then for each mapping the difference $I_{high\_nM}$ between the result of the mapping and $I_{lowM}$ is computed. This difference can be regarded as the result of the mapping of $I_{highM}$:

$$I_{high\_nM} = f_n(I_{lowM} + I_{highM}) - I_{lowM}, n \in \{1,2,3\}.$$

In $I_{high}$ we compute the energy $E_{high}^i$ corresponding to the weighted sum of the norms of $P_{high}^j$ for pixels j in the neighborhood of the pixel i, and similarly the energy $E_n^i$ in each $I_{high\_n}$:

$$E_{high}^i = \sum_{j \in I_{in}} w_{BF}^j \|p_{high}^j\|,$$

$$E_n^i = \sum_{j \in I_{in}} w_{BF}^j \|p_E^j\|,$$

where $w_{BF}^j$ are the weights of the bilateral filter used in the decomposition of the image. Because the process is scanning the image pixel by pixel, some pixels $p_{out}^j$ of the neighborhood have been already processed. For these pixels, $p_{high\_nM}^j$ are replaced by results $p_{out}^j$ in the computation of $E_n^i$:

$$p_E^j = \begin{cases} p_{high\_n}^j & \text{for unprocessed pixels,} \\ p_{out}^j & \text{otherwise} \end{cases}$$

Therefore, anterior decisions are taken into account and Iout depends on the processing order of the pixels. Error diffusion halftoning algorithms have a similar approach. Other options involving optimization tools are possible.

Then the direction of projection for which $E_n^i$ is the closest to $E_{high}^i$ is selected for the pixel i:

$$p_{out}^i = f_{select}(p_{low}^i + p_{high}^i),$$

$$select = \arg\min_n (|E_n^i - E_{high}^i|), n \in \{1,2,3\}.$$

Modified Energy Minimization in SCACLIP

In a variant of the above embodiment, SCACLIP is further optimized by changing the mathematical expression of the energy to preserve.

$I_{highM}$ and $I_{lowM}$ are merged and the 3 mappings $f_n$, n∈{1, 2, 3}, are run:

$$I_{fn} = f_n(I_{lowM} + I_{highM}), n \in \{1,2,3\}.$$

In this variant of SCACLIP, the energy is defined as follows:

$$E_n^i = \sum_{j \in I_{in}} w_{BF}^j \|(p_{fn}^j - p_{fn}^i) - \alpha^i \cdot (p_{in}^j - p_{in}^i)\|.$$

We apply here the same reduction α to $I_{in}$ as defined before for $I_{high}$ to compensate for the possible reduction of local energy of $I_{lowM}$ compared to $I_{lowM}$. The main improvement in this new definition of the energy is that we take into account the direction of the local color variations within a neighborhood while the energy in the original second embodiment took only into account the amplitude of these variations.

Then the direction of projection for which $E_n^i$ is the smallest is selected for the pixel i (see FIG. 8):

$$select = \arg\min_n (E_n^i), n \in \{1,2,3\},$$

$$p_{out}^i = f_{select}(p_{lowM}^i + p_{highM}^i).$$

The proposed variant has as advantage that the local differences between the original image and the resulting image are better minimized.

In comparing the new SCAGMA's as proposed above with SCAGMAs known in the art, the following is noted:

In the system and method presented herein an edge-preserving filter to decompose the image is used. This filter allows to avoid halos. More particular a 5D Bilateral Filter is applied to $I_{in} - GMA(I_{in})$ to form thigh which is then simply added to $GMA(I_{in})$.

According to the proposed embodiment edge preserving multiscale decomposition with an adaptive adjustment of thigh obtained with function k( ) is used. This overcomes drawbacks of the prior art, such as:

(a) an adaptive adjustment in a Gaussian based multilevel decomposition would not avoid halos, (b) an adjustment in the Zolliker and Simon SGMA would result in unbalanced frequency content in the image.

According to the proposed embodiment the method uses a locally adaptive function k( ). In the prior art only a function k( ) with constant scaling is known.

According to the proposed embodiment a locally adaptive mapping (SCACLIP) is provided which compares several mapping alternatives and minimizes the distortion of the local color differences within the input image through the computation of energies.

Advantage is that the frequency content in the resulting image is similar in image regions that are in the destination gamut $Gamut_{Dest}$ and those that are outside it. SGMAs known in the prior art fail on this.

Both embodiments SCACOMP and SCACLIP, presented above, are built on the same framework and therefore have a similar behavior. Yet some differences can be noticed between their output images. In the following we consider these differences, then compare the two algorithms with alternative existing GMAs. Tests have been carried out to evaluate the quality of the output images.

Images produced by SCACOMP are perceived as slightly less saturated and less sharp than SCACLIP but are more likely to be free of artifacts. The differences between the algorithms lead to the differences in the output images:

The initial mapping is different: HPMinΔE in SCACLIP versus SCLIP in SCACOMP. This difference impacts perceived saturation of resulting images.

Ending adaptive mapping is different and the local contrast in SCACLIP output images is better preserved than in SCACOMP output images. Furthermore, SCACLIP is more likely to present local artifacts because of the limit to three possible directions. This limit can cause a sudden switch from one color to another in smoothly varying areas that might cause noticeable artifacts. The difference between the resulting images is attenuated when BPC is applied prior to the mapping of $I_{low}$ in the workflow.

This concludes the explanation of step S7 of the method as presented in FIG. 2.

Finally in step S8 conversion takes place of Iout to the CMYK encoding of the output printer using the relative colorometric intent of its ICC profile. The proposed gamut mapping algorithms is particularly useful for high quality rendering of images captured by a scanner or a digital camera.

Figure 7:
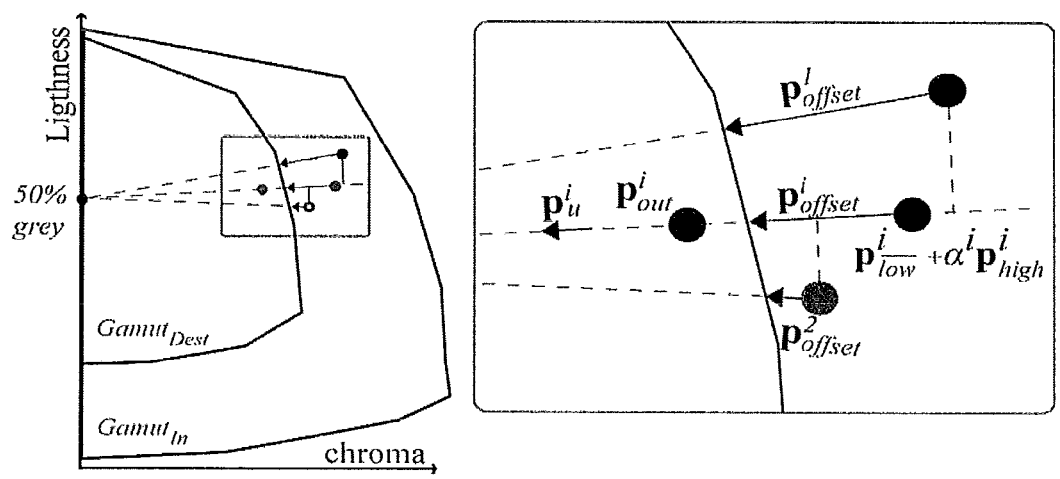
FIG. 7 shows an illustration of mapping according to a first embodiment.

FIG. 7 shows a diagrammatic representation of the most important parts of a digital printer in which the invention as described above is applied. This apparatus is provided with a user interface 65 and an input unit 66 for receiving digital images made elsewhere, e.g. via a network 67, so that the apparatus is used as a printer.

The apparatus is also provided with a scanner 61 having a device for transforming a recorded image (for example a photograph) to a digital image, a memory 62 for storing the digital image, a processing unit 63 for processing the digital image and a printing unit 64 for printing the processed digital image on paper or any suitable medium. The apparatus is also suited for use as a photocopier. For printing digital color images, the printing unit 64 contains a number of color printing sub-units, each printing a basis color. For example four color printing sub-units use the basis colorants cyan, yellow, magenta and black in the form of ink or toner. Colours are rendered with raster techniques such as dithering or error diffusion.

The input image originating from the scanner 61 or the input unit 66 is a color image of which the color values are to be transformed according to an embodiment of the invention. The input unit can be used to input image data of a photograph taken elsewhere by digital recording camera. To make a print, the processing unit 63 is provided with means to carry out the method according to the invention.

The processing unit 63 is connected to the operating unit 65, being a user interface. The operator interface 65 is provided with setting means for manually setting parameters of the gamut mapping function, for example by means of a slide or button.

When the invention is used in a printer in a network environment, the user can, for example, indicate by means of the printer driver at his workstation that a color image must be transformed according to his preferences and then printed taking into account desired values for the parameters. In that case, a processing device in the printer transforms the digital color image to a digital color image mapped on the destination gamut according to the invention, and prints the transformed image.

The transformed image may also be displayed on the display unit 68 for a visual control of the result of the transformation. It is also possible to carry out steps of the gamut mapping method in a separate computer, for example the workstation of a user, and then send intermediate images to a printer, where additional steps for completing the mapping will be carried out, or to a mass memory for storage and later printing.

Figure 8:
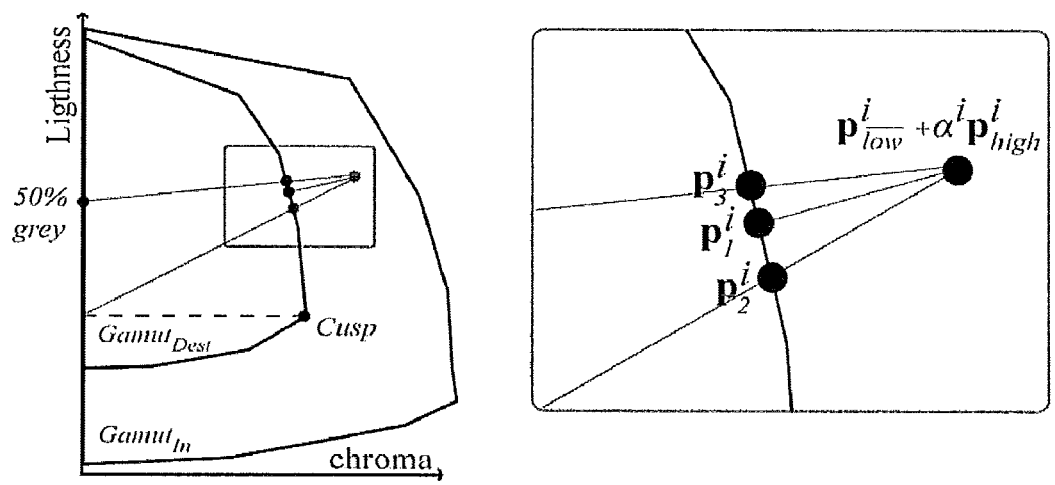
FIG. 8 shows an illustration of mapping according to a second embodiment.

Rendering the image can be performed in a printing apparatus as the one shown partly in FIG. 8. As is shown therein, an ink jet printer comprises a platen 40 driven for rotation in the direction of an arrow A for transporting a paper sheet 42 which serves as an image recording medium. A printhead 44 is mounted on a carriage 46 which is guided on guide rails 48 and travels back and forth in the direction of an arrow B along the platen 40 so as to scan the paper sheet 42. The printhead 44 comprises four nozzle heads 50, one for each of the basic colors yellow, magenta, cyan and black. An ink is supplied to a nozzle head 50 from an ink container (not shown) through a pipe. On the side facing the sheet 42, each nozzle head 50 has a linear array of nozzles 52. The nozzle heads 50 are energised in accordance with image information of an image to be printed on the sheet 42. Signals are transmitted to the printhead 44 through a connector (not shown) mounted on the carriage 46. Signals in accordance with print data arise from a control unit connected to the printhead 44 through a connector (not shown). Each nozzle 52 can be energised separately so as to eject an ink droplet which will form a dot at a corresponding pixel position on the sheet 42. Thus, when the printhead 44 performs a single stroke along the platen 40, each nozzle 52 can be energised to draw a single pixel line of the intended image. As a result, during each forward or backward stroke of the carriage 46, the printhead 44 will print a swath or band of the image, and the number of pixels lines of the swath will correspond to the number of nozzles 52 present in each nozzle array. Although only eight nozzles 52 are shown per nozzle head 50 in FIG. 5, in practice, the number of nozzles is considerably larger.

Transformation of the captured image data may be required to obtain images rendered with an enhanced colors quality.

Although the invention has been explained by reference to the above-described exemplified embodiment, it is not limited thereto. It will be clear to the skilled person that other embodiments are possible within the scope of the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for preparing an image for printing on a printing device having a particular MTF in order to compensate for the MTF, said method comprising the steps of:
adaptively compensating for the printer MTF, by applying MTF compensation in dependence of a first variable;
calculating N compensated images for N values of the first variable; and
for each value of a second variable, the first variable being dependent of the second variable, determining a compensated value for the image according to the actual value of the first variable and the calculated N compensated images,
wherein the first variable is a spatially local mean, the second variable is a spatial position in the image and a compensated image is a compensated High-pass image, and
wherein the step of calculating N compensated High-pass images for N local mean values further comprises the steps of:
for each value of the local means, transforming the image from a spatial domain to a frequency domain;
dividing each obtained image in the frequency domain by a factor for the MTF, and
transforming the images back to the spatial domain.

2. The method according to claim 1, wherein the step of for each value of a second variable, determining a compensated value for the image according to the actual value of the first variable and the calculated N compensated high-pass images further comprises the step of obtaining missing MTF values by linearly interpolating for the frequency range of the image sent to the printer.

3. A method for preparing an image for printing on a printing device having a particular MTF in order to compensate for the MTF, said method comprising the steps of:
adaptively compensating for the printer MTF, by applying MTF compensation in dependence of a first variable;
calculating N compensated images for N values of the first variable;
for each value of a second variable, the first variable being dependent of the second variable, determining a compensated value for the image according to the actual value of the first variable and the calculated N compensated images; and
mapping an original image from a source gamut color subspace to a destination gamut color subspace belonging to the printing device,
wherein before the step of adaptively compensating for the printer MTF the following steps are carried out:
first filtering the original image to obtain a first intermediate image;
gamut mapping the first intermediate image to obtain a second intermediate image;
second filtering the first intermediate image to obtain a third accent intermediate image, where the step of adaptively compensating for the printer MTF is carried out on the third accent intermediate image and provides a third intermediate image; and
merging the second intermediate image and the third intermediate image to obtain a target image.

4. The method according to claim 3, wherein the first filtering step comprises the step of using a bilateral filter for blurring smoothly changing regions of the original image with preservation of strong edges.

5. A system for preparing an image for printing on a printing device having a particular MTF in order to compensate for the MTF by mapping an original image from a source gamut color subsystem to a destination gamut color subspace belonging to a certain output device and having a particular MTF, wherein the system comprises:
a filter for decomposing the original image in several bands, yielding at least a low pass image and a high pass image;
a MTF compensation component for adaptively compensating for the printer MTF, by applying MTF compensation locally, in dependence of a first variable, by
calculating N compensated images for N values of the first variable by, for each value of the local means, transforming the image from a spatial domain to a frequency domain, dividing each obtained image in the frequency domain by a factor for the MTF, and transforming the images back to the spatial domain; and
for each value of a second variable, the first variable being dependent of the second variable, determining a compensated value for the image according to the actual value of the first variable and the calculated N compensated images,
wherein the first variable is a spatially local mean, the second variable is a spatial position in the image and a compensated image is a compensated high pass image; and
an adaptive merging and mapping component for merging and mapping the MTF compensated high pass image and the low pass image yielding an output image.

6. The system according to claim 5, wherein the output device is an inkjet printing system.

7. A computer program embodied on a non-transitory computer readable medium for causing an apparatus to execute the method for mapping an original image from a source gamut colour subspace to a destination gamut colour subspace according to claim 4.

* * * * *